(12) United States Patent
Browne et al.

(10) Patent No.: US 7,758,121 B2
(45) Date of Patent: Jul. 20, 2010

(54) ACTIVE MATERIAL BASED CONFORMABLE AND RECONFIGURABLE SEATS

(75) Inventors: Alan L. Browne, Grosse Pointe, MI (US); Nancy L. Johnson, Northville, MI (US); Pablo D. Zavattieri, Ann Arbor, MI (US); Ukpai I. Ukpai, West Bloomfield, MI (US); John C. Ulicny, Oxford, MI (US); John A. Cafeo, Farmington, MI (US); Rainer A. Glaser, Washington, MI (US); Gary L. Jones, Farmington Hills, MI (US); James Y. Khoury, Macomb, MI (US); Carol Ann Perelli, Rochester, MI (US); William R. Rodgers, Bloomfield Township, MI (US); Xiujie Gao, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 53 days.

(21) Appl. No.: 11/734,308

(22) Filed: Apr. 12, 2007

(65) Prior Publication Data
US 2007/0246285 A1 Oct. 25, 2007

Related U.S. Application Data

(60) Provisional application No. 60/792,482, filed on Apr. 17, 2006.

(51) Int. Cl.
*B60N 2/427* (2006.01)
(52) U.S. Cl. .................. 297/284.11; 297/452.41; 297/216.1
(58) Field of Classification Search ............ 297/452.41, 297/284.9, 284.11, 216.1
See application file for complete search history.

(56) References Cited

U.S. PATENT DOCUMENTS

| | | | | |
|---|---|---|---|---|
| 4,707,027 A * | 11/1987 | Horvath et al. | ........... | 297/284.6 |
| 5,695,242 A * | 12/1997 | Brantman et al. | ........ | 297/216.1 |
| 5,707,109 A * | 1/1998 | Massara et al. | .......... | 297/284.9 |
| 5,769,489 A * | 6/1998 | Dellanno | ............... | 297/216.14 |
| 5,975,629 A * | 11/1999 | Lorbiecki | .................... | 297/200 |
| 6,055,473 A * | 4/2000 | Zwolinski et al. | ............. | 701/49 |
| 6,203,105 B1 * | 3/2001 | Rhodes, Jr. | ............... | 297/284.6 |
| 6,206,474 B1 * | 3/2001 | Kruse et al. | ............ | 297/452.41 |
| 6,213,548 B1 * | 4/2001 | Van Wynsberghe et al. | ..................... | 297/216.12 |
| 6,331,014 B1 * | 12/2001 | Breed | ....................... | 280/730.1 |
| 6,450,573 B1 * | 9/2002 | Yamaguchi et al. | ...... | 297/216.1 |
| 6,578,916 B2 * | 6/2003 | Longhi et al. | ............ | 297/284.3 |
| 6,648,409 B1 * | 11/2003 | Laporte | ................... | 297/216.1 |
| 6,672,667 B1 * | 1/2004 | Park | ....................... | 297/344.1 |
| 6,739,657 B2 * | 5/2004 | Heilig et al. | ............. | 297/216.1 |
| 6,752,454 B2 * | 6/2004 | Ruel et al. | ................ | 297/216.1 |
| 6,786,508 B2 * | 9/2004 | Fraley et al. | ................ | 280/751 |
| 6,805,404 B1 * | 10/2004 | Breed | .................... | 297/216.12 |
| 6,896,325 B2 * | 5/2005 | Takedomi et al. | ........ | 297/216.1 |
| 6,910,714 B2 * | 6/2005 | Browne et al. | ............. | 280/753 |
| 7,093,898 B2 * | 8/2006 | De Guevara | ............ | 297/284.6 |
| 7,204,472 B2 * | 4/2007 | Jones et al. | ............ | 251/129.06 |

(Continued)

*Primary Examiner*—David Dunn
*Assistant Examiner*—James Alex (57) ABSTRACT

A seat assembly includes an active material in operative communication with a seat surface configured to undergo a change in at least one property upon receipt of an activation signal, wherein the change in at least one property is effective to change at least one feature of the seat surface.

5 Claims, 7 Drawing Sheets

U.S. PATENT DOCUMENTS

| | | | |
|---|---|---|---|
| 7,264,271 B2 * | 9/2007 | Barvosa-Carter et al. | 280/751 |
| 7,284,792 B1 * | 10/2007 | Dabney et al. | 297/216.11 |
| 7,293,836 B2 * | 11/2007 | Browne et al. | 297/344.11 |
| 7,448,678 B2 * | 11/2008 | Browne et al. | 297/216.12 |
| 7,556,313 B2 * | 7/2009 | Browne et al. | 297/216.12 |
| 2001/0005097 A1 * | 6/2001 | Heilig et al. | 297/452.55 |
| 2002/0047295 A1 * | 4/2002 | Sullivan et al. | 297/216.1 |
| 2003/0023363 A1 * | 1/2003 | Katz et al. | 701/49 |
| 2003/0222489 A1 * | 12/2003 | Takedomi et al. | 297/216.1 |
| 2006/0244293 A1 * | 11/2006 | Buffa | 297/284.4 |
| 2006/0273644 A1 * | 12/2006 | Sturt et al. | 297/284.9 |
| 2007/0063566 A1 * | 3/2007 | Browne et al. | 297/344.11 |
| 2007/0080013 A1 * | 4/2007 | Melz et al. | 180/274 |
| 2007/0182146 A1 * | 8/2007 | Browne et al. | 280/753 |
| 2007/0188004 A1 * | 8/2007 | Browne et al. | 297/391 |
| 2007/0236067 A1 * | 10/2007 | Nathan et al. | 297/378.12 |
| 2007/0246979 A1 * | 10/2007 | Browne et al. | 297/216.12 |
| 2008/0005843 A1 * | 1/2008 | Lokhorst et al. | 5/655.3 |
| 2008/0100118 A1 * | 5/2008 | Young et al. | 297/404 |
| 2008/0129098 A1 * | 6/2008 | Kennedy et al. | 297/354.1 |
| 2008/0272615 A1 * | 11/2008 | McKnight et al. | 296/180.5 |

* cited by examiner

ACTIVE MATERIAL BASED CONFORMABLE AND RECONFIGURABLE SEATS

CROSS REFERENCE TO RELATED APPLICATIONS

The present application relates to and claims the benefit of priority to U.S. Provisional Application No. 60/792,482 filed Apr. 17, 2006, incorporated herein by reference in its entirety.

BACKGROUND

This disclosure generally relates to active material based seats for reshaping and/or reconfiguring the seat.

Adjustable lumbar supports have been known. These generally include a mechanical device to manipulate the lumbar support. It is also known to provide seats with vibrotactile devices and displacement devices to alert a driver of a potential impact event or to warn a driver when the vehicle drifts out of a designated lane. All of these systems utilize mechanical actuators such as solenoids, pistons, and the like that act in concert to provide the desired configuration. Other adjustable supports include the use of an air bladder. Conventional mechanical actuators are costly, their form factor (ratios of volume to created displacement and/or input energy to work output) is large, they have higher power consumption, and it is not a straightforward process to utilize their output to make conventional seats meet different occupant's needs when considering the wide variety of occupant sizes that must be comprehended in the design.

While the current systems can be adequate for their intended use, it is desirable to provide other systems that overcome some of the problems inherent with the use of mechanical actuators.

BRIEF SUMMARY

Disclosed herein are active material based seats. In one embodiment, a seat assembly includes an active material in operative communication with a seat surface configured to undergo a change in at least one property upon receipt of an activation signal, wherein the change in at least one property is effective to change at least one feature of the seat surface.

A method of conforming a seat to an occupant includes activating an active material with an activation signal, wherein the active material is in operative communication with a seat surface and is configured to undergo a change in at least one property upon receipt of the activation signal, wherein the change in a property is effective to change at least one feature of the seat surface.

In another embodiment, a seat assembly includes a seat surface comprising a reversible curb, and an active material in operative communication with the seat surface configured to undergo a change in at least one property upon receipt of an activation signal, wherein the change in at least one property is effective to transition the reversible curb from a stowed position to a deployed position, wherein in the stowed position the seat surface is suitable for seating an occupant and in the deployed position the reversible curve is configured to hold an item in place on the seat surface.

The above described and other features are exemplified by the following figures and detailed description.

BRIEF DESCRIPTION OF THE DRAWINGS

Referring now to the figures, which are exemplary embodiments and wherein like elements are numbered alike.

DETAILED DESCRIPTION

Conformable and reconfigurable seats and methods of their use are described herein. In contrast to existing conformable seats, the seats disclosed herein advantageously employ active materials. The entire seat as well as the cushions, pads, and other add-on seating items that may be placed over or on a support structure can be in operative communication with an active material to function as a modifiable seat for comfort and safety. The active material permits the seat to reversibly adjust, conform, massage, reconfigure, and the like in response to a change in a property of the active material upon receipt of an activation signal. The active material based seats can include, without limitation, passenger seats, child seats, footrests, arm rests, head rests, and the like, that can be utilized in cars, trucks, airlines, trains or any other transportation vehicle. In addition, the active material based seats can be configured for medical and therapeutic use and can be used in entertainment and home seats for comfort and massaging.

The term "active material" as used herein generally refers to a material that exhibits a change in a property such as dimension, shape, phase, orientation, stiffness, and the like upon application of an activation signal. Suitable active materials include, without limitation, shape memory alloys (SMA), ferromagnetic shape memory alloys (MSMA), shape memory polymers (SMP), piezoelectric materials, electroactive polymers (EAP), magnetorheological (MR) elastomers, electrorheological (ER) elastomers, ER fluids, MR fluids, and the like. Depending on the particular active material, the activation signal can take the form of, without limitation, an electric current, an electric field (voltage), a temperature change, a magnetic field, a mechanical loading or stressing, and the like.

Also, as used herein, the terms "first", "second", and the like do not denote any order or importance, but rather are used to distinguish one element from another, and the terms "the", "a", and "an" do not denote a limitation of quantity, but rather denote the presence of at least one of the referenced item. The modifier "about" used in connection with a quantity is inclusive of the stated value and has the meaning dictated by the context (e.g., includes the degree of error associated with measurement of the particular quantity). Furthermore, all ranges disclosed herein are inclusive of the endpoints and independently combinable.

In one embodiment, the active material based seat is configured for reshaping and/or changing the modulus of the seat in conjunction with various sensor based comfort, convenience, and safety systems. Upon receipt of an activation signal, the active material undergoes a change in at least one property (e.g. elastic modulus), which can be effective to change at least one feature of the seat, such as, without limitation, the shape, stiffness, configuration, geometry, compliance, and the like of the active material based seat. The activation signal can be applied to the active material either actively in response to a signal from an activation device based on processing of sensor inputs and/or occupant requests such as through manual or voice activation of controls or programmed settings, or it can be applied passively in response to changes in the environment such as temperature or light level. Furthermore, for certain active materials, the magnitude of the change in the property is proportional to the magnitude of the applied activation signal. Through differences in the magnitude and/or rate of application of the activation signal, therefore, the magnitude and the speed of active material property changes can be controlled. This has the effect of controlling and even tailoring the active material based seat changes to the personal preferences of a seat occupant. For example, such magnitude and speed variable property changes can be desirable for massaging functions or to indicate an increasing likelihood of a driving threat, e.g., such as the need to slow down for an approaching curve. Changes in the frequency of activation and in the amount of material activated could similarly provide this function. Even further, changes in the location of the active material being activated could be used to create wave-like motions and/or stiffness changes for enhanced massaging functions, to indicate the presence and location of neighboring vehicles, or to alert the user to the proximity of a desired destination. As yet another example, different regions could be activated to meet the differing needs of impact events from different angles or even for the differing needs of an occupant who wants to sleep compared to one who needs to be alert and attentive.

To better understand the various ways in which a seat can employ active materials to reversibly reconfigure and conform the seat to a particular occupant or for a particular use/event, it is necessary to understand the nature and mechanics of the desirable active materials. As previously mentioned, suitable active materials for the active material based seats include, without limitation, shape memory alloys ("SMAs"; e.g., thermal and stress activated shape memory alloys and magnetic shape memory alloys (MSMA)), electroactive polymers (EAPs) such as dielectric elastomers, ionic polymer metal composites (IPMC), piezoelectric materials (e.g., polymers, ceramics), and shape memory polymers (SMPs), shape memory ceramics (SMCs), baroplastics, magnetorheological (MR) materials (e.g., fluids and elastomers), electrorheological (ER) materials (e.g., fluids, and elastomers), composites of the foregoing active materials with non-active materials, systems comprising at least one of the foregoing active materials, and combinations comprising at least one of the foregoing active materials. For convenience and by way of example, reference herein will be made to shape memory alloys and shape memory polymers. The shape memory ceramics, baroplastics, and the like, can be employed in a similar manner. For example, with baroplastic materials, a pressure induced mixing of nanophase domains of high and low glass transition temperature (Tg) components effects the shape change. Baroplastics can be processed at relatively low temperatures repeatedly without degradation. SMCs are similar to SMAs but can tolerate much higher operating temperatures than can other shape-memory materials. An example of an SMC is a piezoelectric material.

The ability of shape memory materials to return to their original shape upon the application or removal of external stimuli has led to their use in actuators to produce force/apply force resulting in desired motion. Active material actuators offer the potential for a reduction in actuator size, weight, volume, cost, noise and an increase in robustness in comparison with traditional electromechanical and hydraulic means of actuation. Ferromagnetic SMA's, for example, exhibit rapid dimensional changes of up to several percent in response to (and proportional to the strength of) an applied magnetic field. However, these changes are one-way changes and use the application of either a biasing force or a field reversal to return the ferromagnetic SMA to its starting configuration.

Shape memory alloys are alloy compositions with at least two different temperature-dependent phases or polarity. The most commonly utilized of these phases are the so-called martensite and austenite phases. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature (As). The temperature at which this phenomenon is complete is often called the austenite finish temperature (Af). When the shape memory alloy is in the austenite phase and is cooled, it begins to change into the martensite phase, and the temperature at which this phenomenon starts is often referred to as the martensite start temperature (Ms). The temperature at which austenite finishes transforming to martensite is often called the martensite finish temperature (Mf). The range between As and Af is often referred to as the martensite-to-austenite transformation temperature range while that between Ms and Mf is often called the austenite-to-martensite transformation temperature range. It should be noted that the above-mentioned transition temperatures are functions of the stress experienced by the SMA sample. Generally, these temperatures increase with increasing stress. In view of the foregoing properties, deformation of the shape memory alloy is preferably at or below the austenite start temperature (at or below As). Subsequent heating above the austenite start temperature causes the deformed shape memory material sample to begin to revert back to its original (nonstressed) permanent shape until completion at the austenite finish temperature. Thus, a suitable activation input or signal for use with shape memory alloys is a thermal activation signal having a magnitude that is sufficient to cause transformations between the martensite and austenite phases.

The temperature at which the shape memory alloy remembers its high temperature form (i.e., its original, nonstressed shape) when heated can be adjusted by slight changes in the composition of the alloy and through thermo-mechanical processing. In nickel-titanium shape memory alloys, for example, it can be changed from above about 100° C. to below about −100° C. The shape recovery process can occur over a range of just a few degrees or exhibit a more gradual recovery over a wider temperature range. The start or finish of the transformation can be controlled to within several degrees depending on the desired application and alloy composition. The mechanical properties of the shape memory alloy vary greatly over the temperature range spanning their transformation, typically providing shape memory effect and superelastic effect. For example, in the martensite phase a lower elastic modulus than in the austenite phase is observed. Shape memory alloys in the martensite phase can undergo large deformations by realigning the crystal structure arrangement with the applied stress. The material will retain this shape after the stress is removed. In other words, stress induced phase changes in SMA are two-way by nature; application of sufficient stress when an SMA is in its austenitic phase will cause it to change to its lower modulus martensitic phase. Removal of the applied stress will cause the SMA to switch back to its austenitic phase, and in so doing, recovering its starting shape and higher modulus.

Exemplary shape memory alloy materials include nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and so forth. The alloys can be binary, ternary, or any higher order so long as the alloy composition exhibits a shape memory effect, e.g., change in shape, orientation, yield strength, flexural modulus, damping capacity, superelasticity, and/or similar properties. Selection of a suitable shape memory alloy composition depends, in part, on the temperature range of the intended application.

The recovery to the austenite phase at a higher temperature is accompanied by very large (compared to those needed to deform the material) which can be as high as the inherent yield strength of the austenite material, sometimes up to three or more times that of the deformed martensite phase. For applications that require a large number of operating cycles, a strain of less than or equal to 4% or so of the deformed length of wire used can be obtained. In experiments performed with Flexinol® wires of 0.5 millimeter (mm) diameter, the maximum strain in the order of 4% was obtained. This percentage can increase up to 8% for thinner wires or for applications with a low number of cycles. This limit in the obtainable strain places some constraints in the application of SMA actuators where space is limited.

MSMAs are alloys, often composed of Ni—Mn—Ga, that change shape due to strain induced by a magnetic field. MSMAs have internal variants with different magnetic and crystallographic orientations. In a magnetic field, the proportions of these variants change, resulting in an overall shape change of the material. An MSMA actuator generally requires that the MSMA material be placed between coils of an electromagnet. Electric current running through the coil induces a magnetic field through the MSMA material, causing a change in shape.

As previously mentioned, other exemplary shape memory materials are shape memory polymers (SMPs). "Shape memory polymer" generally refers to a polymeric material, which exhibits a change in a property, such as a modulus, a dimension, a coefficient of thermal expansion, the permeability to moisture, an optical property (e.g., transmissivity), or a combination comprising at least one of the foregoing properties in combination with a change in its a microstructure and/or morphology upon application of an activation signal. Shape memory polymers can be thermoresponsive (i.e., the change in the property is caused by a thermal activation signal delivered either directly via heat supply or removal, or indirectly via a vibration of a frequency that is appropriate to excite high amplitude vibrations at the molecular level which lead to internal generation of heat), photoresponsive (i.e., the change in the property is caused by an electromagnetic radiation activation signal), moisture-responsive (i.e., the change in the property is caused by a liquid activation signal such as humidity, water vapor, or water), chemo-responsive (i.e. responsive to a change in the concentration of one or more chemical species in its environment; e.g., the concentration of H+ ion—the pH of the environment), or a combination comprising at least one of the foregoing.

Generally, SMPs are phase segregated co-polymers comprising at least two different units, which can be described as defining different segments within the SMP, each segment contributing differently to the overall properties of the SMP. As used herein, the term "segment" refers to a block, graft, or sequence of the same or similar monomer or oligomer units, which are copolymerized to form the SMP. Each segment can be (semi-)crystalline or amorphous and will have a corresponding melting point or glass transition temperature (Tg), respectively. The term "thermal transition temperature" is used herein for convenience to generically refer to either a Tg or a melting point depending on whether the segment is an amorphous segment or a crystalline segment. For SMPs comprising (n) segments, the SMP is said to have a hard segment and (n−1) soft segments, wherein the hard segment has a higher thermal transition temperature than any soft segment. Thus, the SMP has (n) thermal transition temperatures. The thermal transition temperature of the hard segment is termed the "last transition temperature", and the lowest thermal transition temperature of the so-called "softest" segment is termed the "first transition temperature". It is important to note that if the SMP has multiple segments characterized by the same thermal transition temperature, which is also the last transition temperature, then the SMP is said to have multiple hard segments.

When the SMP is heated above the last transition temperature, the SMP material can be imparted a permanent shape. A permanent shape for the SMP can be set or memorized by subsequently cooling the SMP below that temperature. As used herein, the terms "original shape", "previously defined shape", "predetermined shape", and "permanent shape" are synonymous and are intended to be used interchangeably. A temporary shape can be set by heating the material to a temperature higher than a thermal transition temperature of any soft segment yet below the last transition temperature, applying an external stress or load to deform the SMP, and then cooling below the particular thermal transition temperature of the soft segment while maintaining the deforming external stress or load.

The permanent shape can be recovered by heating the material, with the stress or load removed, above the particular thermal transition temperature of the soft segment yet below the last transition temperature. Thus, it should be clear that by combining multiple soft segments it is possible to demonstrate multiple temporary shapes and with multiple hard segments it can be possible to demonstrate multiple permanent shapes. Similarly using a layered or composite approach, a combination of multiple SMPs will demonstrate transitions between multiple temporary and permanent shapes.

The shape memory material may also comprise a piezoelectric material. Also, in certain embodiments, the piezoelectric material can be configured as an actuator for providing rapid deployment. As used herein, the term "piezoelectric" is used to describe a material that mechanically deforms (changes shape) when a voltage potential is applied, or conversely, generates an electrical charge when mechanically deformed. Piezoelectrics exhibit a small change in dimensions when subjected to the applied voltage, with the response being proportional to the strength of the applied field and being quite fast (capable of easily reaching the thousand hertz range). Because their dimensional change is small (e.g., less than 0.1%), to dramatically increase the magnitude of dimensional change they are usually used in the form of piezo ceramic unimorph and bi-morph flat patch actuators which are constructed so as to bow into a concave or convex shape upon application of a relatively small voltage. The morphing/bowing of such patches within the liner of the holder is suitable for grasping/releasing the object held.

One type of unimorph is a structure composed of a single piezoelectric element externally bonded to a flexible metal foil or strip, which is stimulated by the piezoelectric element when activated with a changing voltage and results in an axial buckling or deflection as it opposes the movement of the piezoelectric element. The actuator movement for a unimorph can be by contraction or expansion. Unimorphs can exhibit a strain of as high as about 10%, but generally can only sustain low loads relative to the overall dimensions of the unimorph structure.

In contrast to the unimorph piezoelectric device, a bimorph device includes an intermediate flexible metal foil sandwiched between two piezoelectric elements. Bimorphs exhibit more displacement than unimorphs because under the applied voltage one ceramic element will contract while the other expands. Bimorphs can exhibit strains up to about 20%, but similar to unimorphs, generally cannot sustain high loads relative to the overall dimensions of the unimorph structure.

Exemplary piezoelectric materials include inorganic compounds, organic compounds, and metals. With regard to organic materials, all of the polymeric materials with noncentrosymmetric structure and large dipole moment group(s) on the main chain or on the side-chain, or on both chains within the molecules, can be used as candidates for the piezoelectric film. Examples of polymers include poly(sodium 4-styrene-sulfonate) ("PSS"), poly S-119 (Poly(vinylamine) backbone azo chromophore), and their derivatives; polyfluorocarbines, including polyvinylidene fluoride ("PVDF"), its co-polymer vinylidene fluoride ("VDF"), trifluorethylene (TrFE), and their derivatives; polychlorocarbons, including poly(vinylchloride) ("PVC"), polyvinylidene chloride ("PVC2"), and their derivatives; polyacrylonitriles ("PAN"), and their derivatives; polycarboxylic acids, including poly (methacrylic acid ("PMA"), and their derivatives; polyureas, and their derivatives; polyurethanes ("PUE"), and their derivatives; bio-polymer molecules such as poly-L-lactic acids and their derivatives, and membrane proteins, as well as phosphate bio-molecules; polyanilines and their derivatives, and all of the derivatives of tetraamines; polyimides, including Kapton® molecules and polyetherimide ("PEI"), and their derivatives; all of the membrane polymers; poly (N-vinyl pyrrolidone) ("PVP") homopolymer, and its derivatives, and random PVP-co-vinyl acetate ("PVAc") copolymers; and all of the aromatic polymers with dipole moment groups in the main-chain or side-chains, or in both the main-chain and the side-chains; as well as combinations comprising at least one of the foregoing.

Further, piezoelectric materials can include Pt, Pd, Ni, T, Cr, Fe, Ag, Au, Cu, and metal alloys comprising at least one of the foregoing, as well as combinations comprising at least one of the foregoing. These piezoelectric materials can also include, for example, metal oxide such as $SiO_2$, $Al_2O_3$, $ZrO_2$, $TiO_2$, $SrTiO_3$, $PbTiO_3$, $BaTiO_3$, $FeO_3$, $Fe_3O_4$, $ZnO$, and combinations comprising at least one of the foregoing; and Group VIA and IIB compounds, such as CdSe, CdS, GaAs, $AgCaSe_2$, ZnSe, Gap, InP, ZnS, and combinations comprising at least one of the foregoing.

MR fluids is a class of smart materials whose rheological properties can rapidly change upon application of a magnetic field (e.g., property changes of several hundred percent can be effected within milliseconds), making them quite suitable in locking in (constraining) or allowing the relaxation of shapes/deformations through a significant change in their shear strength, such changes being usefully employed with grasping and release of objects in embodiments described herein. Exemplary shape memory materials also comprise magnetorheological (MR) and ER polymers. MR polymers are suspensions of micrometer-sized, magnetically polarizable particles (e.g., ferromagnetic or paramagnetic particles as described below) in a polymer (e.g., a thermoset elastic polymer or rubber). Exemplary polymer matrices include poly-alpha-olefins, natural rubber, silicone, polybutadiene, polyethylene, polyisoprene, and combinations comprising at least one of the foregoing.

The stiffness and potentially the shape of the polymer structure are attained by changing the shear and compression/tension moduli by varying the strength of the applied magnetic field. The MR polymers typically develop their structure when exposed to a magnetic field in as little as a few milliseconds, with the stiffness and shape changes being proportional to the strength of the applied field. Discontinuing the exposure of the MR polymers to the magnetic field reverses the process and the elastomer returns to its lower modulus state.

MR fluids exhibit a shear strength which is proportional to the magnitude of an applied magnetic field, wherein property changes of several hundred percent can be effected within milliseconds. Although these materials also face the issues packaging of the coils necessary to generate the applied field, they can be used as a locking or release mechanism, for example, for spring based grasping/releasing.

Suitable MR fluid materials include ferromagnetic or paramagnetic particles dispersed in a carrier, e.g., in an amount of about 5.0 volume percent (vol %) to about 50 vol % based upon a total volume of MR composition. Suitable particles include iron; iron oxides (including Fe2O3 and Fe3O4); iron nitride; iron carbide; carbonyl iron; nickel; cobalt; chromium dioxide; and combinations comprising at least one of the foregoing; e.g., nickel alloys; cobalt alloys; iron alloys such as stainless steel, silicon steel, as well as others including aluminum, silicon, cobalt, nickel, vanadium, molybdenum, chromium, tungsten, manganese and/or copper.

The particle size should be selected so that the particles exhibit multiple magnetic domain characteristics when subjected to a magnetic field. Particle diameters (e.g., as measured along a major axis of the particle) can be less than or equal to about 1,000 micrometers (μm) (e.g., about 0.1 micrometer to about 1,000 micrometers), or, more specifically, about 0.5 to about 500 micrometers, and more specifically, about 10 to about 100 micrometers.

The viscosity of the carrier can be less than or equal to about 100,000 centipoise (cPs) (e.g., about 1 cPs to about 100,000 cPs), or, more specifically, about 1 cPs to about 10,000 cPs, or, even more specifically, about 1 cPs to about 1,000 centipoise. Possible carriers (e.g., carrier fluids) include organic liquids, especially non-polar organic liquids. Examples include oils (e.g., silicon oils, mineral oils, paraffin oils, white oils, hydraulic oils, transformer oils, and synthetic hydrocarbon oils (e.g., unsaturated and/or saturated)); halogenated organic liquids (such as chlorinated hydrocarbons, halogenated paraffins, perfluorinated polyethers and fluorinated hydrocarbons); diesters; polyoxyalkylenes; silicones (e.g., fluorinated silicones); cyanoalkyl siloxanes; glycols; and combinations comprising at least one of the foregoing carriers.

Aqueous carriers can also be used, especially those comprising hydrophilic mineral clays such as bentonite or hectorite. The aqueous carrier can comprise water or water comprising a polar, water-miscible organic solvent (e.g., methanol, ethanol, propanol, dimethyl sulfoxide, dimethyl formamide, ethylene carbonate, propylene carbonate, acetone, tetrahydrofuran, diethyl ether, ethylene glycol, propylene glycol, and the like), as well as combinations comprising at least one of the foregoing carriers. The amount of polar organic solvent in the carrier can be less than or equal to about 5.0 vol % (e.g., about 0.1 vol % to about 5.0 vol %), based upon a total volume of the MR fluid, or, more specifically, about 1.0 vol % to about 3.0%. The pH of the aqueous carrier can be less than or equal to about 13 (e.g., about 5.0 to about 13), or, more specifically, about 8.0 to about 9.0.

When the aqueous carriers comprises natural and/or synthetic bentonite and/or hectorite, the amount of clay (bentonite and/or hectorite) in the MR fluid can be less than or equal to about 10 percent by weight (wt %) based upon a total weight of the MR fluid, or, more specifically, about 0.1 wt % to about 8.0 wt %, or, more specifically, about 1.0 wt % to about 6.0 wt %, or, even more specifically, about 2.0 wt % to about 6.0 wt %.

Optional components in the MR fluid include clays (e.g., organoclays), carboxylate soaps, dispersants, corrosion inhibitors, lubricants, anti-wear additives, antioxidants, thixotropic agents, and/or suspension agents. Carboxylate soaps include ferrous oleate, ferrous naphthenate, ferrous stearate, aluminum di- and tri-stearate, lithium stearate, calcium stearate, zinc stearate, and/or sodium stearate; surfactants (such as sulfonates, phosphate esters, stearic acid, glycerol monooleate, sorbitan sesquioleate, laurates, fatty acids, fatty alcohols, fluoroaliphatic polymeric esters); and coupling agents (such as titanate, aluminate, and zirconate); as well as combinations comprising at least one of the foregoing. Polyalkylene diols, such as polyethylene glycol, and partially esterified polyols can also be included.

Electrorheological fluids (ER) fluids are similar to MR fluids in that they exhibit a change in shear strength when subjected to an applied field, in this case a voltage rather than a magnetic field. Response is quick and proportional to the strength of the applied field. It is, however, an order of magnitude less than that of MR fluids and several thousand volts are typically required.

Electronic electroactive polymers (EAPs) are a laminate of a pair of electrodes with an intermediate layer of low elastic modulus dielectric material. Applying a potential between the electrodes squeezes the intermediate layer causing it to expand in plane. They exhibit a response proportional to the applied field and can be actuated at high frequencies. EAP morphing laminate sheets have been demonstrated. Their major downside is that they require applied voltages approximately three orders of magnitude greater than those required by piezoelectrics Electroactive polymers include those polymeric materials that exhibit piezoelectric, pyroelectric, or electrostrictive properties in response to electrical or mechanical fields. An example of an electrostrictive-grafted elastomer with a piezoelectric poly(vinylidene fluoride-trifluoro-ethylene) copolymer. This combination has the ability to produce a varied amount of ferroelectric-electrostrictive molecular composite systems.

Materials suitable for use as an electroactive polymer may include any substantially insulating polymer and/or rubber that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties (e.g., copolymers comprising silicone and acrylic moieties, polymer blends comprising a silicone elastomer and an acrylic elastomer, and so forth).

Materials used as an electroactive polymer can be selected based on material propert(ies) such as a high electrical breakdown strength, a low modulus of elasticity (e.g., for large or small deformations), a high dielectric constant, and so forth. In one embodiment, the polymer can be selected such that is has an elastic modulus of less than or equal to about 100 MPa. In another embodiment, the polymer can be selected such that is has a maximum actuation pressure of about 0.05 megapascals (MPa) and about 10 MPa, or, more specifically, about 0.3 MPa to about 3 MPa. In another embodiment, the polymer can be selected such that is has a dielectric constant of about 2 and about 20, or, more specifically, about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers can be fabricated and implemented as thin films, e.g., having a thickness of less than or equal to about 50 micrometers.

As electroactive polymers may deflect at high strains, electrodes attached to the polymers should also deflect without compromising mechanical or electrical performance. Generally, electrodes suitable for use can be of any shape and material provided that they are able to supply a suitable voltage to, or receive a suitable voltage from, an electroactive polymer. The voltage can be either constant or varying over time. In one embodiment, the electrodes adhere to a surface of the polymer. Electrodes adhering to the polymer can be compliant and conform to the changing shape of the polymer. The electrodes can be only applied to a portion of an electroactive polymer and define an active area according to their geometry. Various types of electrodes include structured electrodes comprising metal traces and charge distribution layers, textured electrodes comprising varying out of plane dimensions, conductive greases (such as carbon greases and silver greases), colloidal suspensions, high aspect ratio conductive materials (such as carbon fibrils and carbon nanotubes, and mixtures of ionically conductive materials), as well as combinations comprising at least one of the foregoing.

Exemplary electrode materials can include graphite, carbon black, colloidal suspensions, metals (including silver and gold), filled gels and polymers (e.g., silver filled and carbon filled gels and polymers), and ionically or electronically conductive polymers, as well as combinations comprising at least one of the foregoing. It is understood that certain electrode materials may work well with particular polymers and may not work as well for others. By way of example, carbon fibrils work well with acrylic elastomer polymers while not as well with silicone polymers.

Magnetostrictives are solids that develop a large mechanical deformation when subjected to an external magnetic field. This magnetostriction phenomenon is attributed to the rotations of small magnetic domains in the materials, which are randomly oriented when the material is not exposed to a magnetic field. The shape change is largest in ferromagnetic or ferromagnetic solids. These materials possess a very fast response capability, with the strain proportional to the strength of the applied magnetic field, and they return to their starting dimension upon removal of the field. However, these materials have maximum strains of about 0.1 to about 0.2 percent.

Shear-thickening fluids (STF) is the name given to the phenomena where the viscosity of a fluid increases with increasing shear rate (or equivalently, stress). Shear thickening can occur with relatively large magnitudes, to the point that the fluid can behave like a solid and fracture. Shear thickening is a non-Newtonian flow behavior. On the other hand, shear-thinning fluids are non-Newtonian as well, as their viscosities decrease as the applied shearing stress increases. As an example, ketchup is shear-thinning. The advantage of these fluids (in comparison with the MR or ER fluids) is that they do not require an external field. They are passively activated by rapid movements such as can occur in vehicle crashes.

Figure 1:
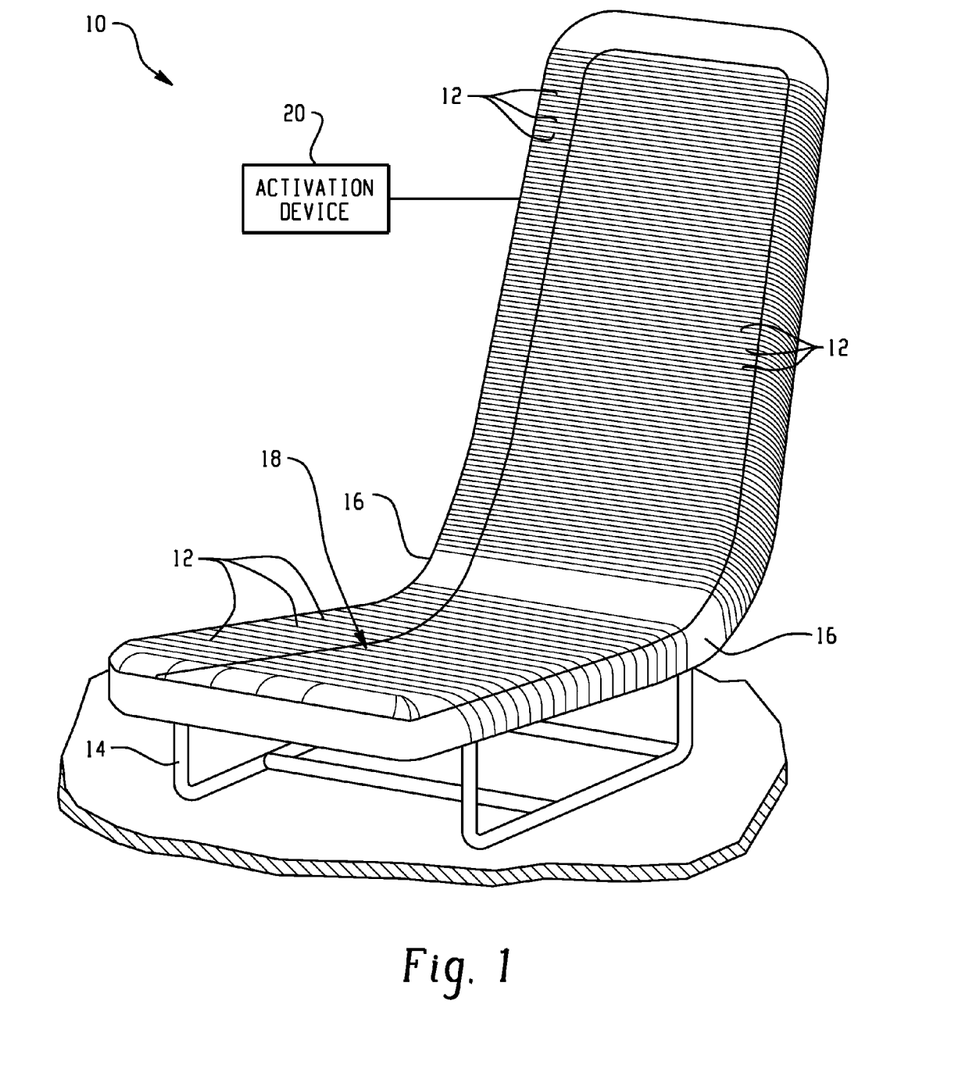
FIG. 1 is a perspective view of an active material based seat in accordance with one embodiment of the present disclosure.

Turning now to FIG. 1, an active material based seat generally designated by reference numeral 10 is illustrated. The seat 10 comprises a plurality of SMA filaments 12 in operative communication with a frame 14. In this embodiment, the SMA filaments 12 extend perpendicularly to the sides 16 of the frame 14 to form a seat surface 18. In another embodiment, the SMA filaments 12 can be configured in another manner relative to sides 16 of the frame 14, such as for instance, a parallel configuration. The SMA filaments 12 are configured to undergo a change in at least one property, e.g., stiffness, or length dimension, upon receipt of an activation signal, e.g., a thermal signal, from an activation device 20. The change in stiffness due to a temperature change is accompanied by a change in a length dimension. By selectively applying the activation signal to a selected one or more of the SMA filaments, a range of conformable adjustment is available for the active material based seat 10. Further, the transformation temperature range of the individual SMA filaments 12 can be appropriately chosen to ensure occupant safety as well as comfort. In the case of heating with electric current, the filaments can be well insulated/isolated for safety.

The active material based seats can have multiple sections capable of conforming and reconfiguring beyond the exemplary embodiments mentioned above. The active material enabled seats can be configured to fold, flex, twist, inflate, follow contours in multiple planes, and the like. Such motion can be achieved, for example without limitation, by distributing one or more SMA elements (e.g., wire, ribbons, filaments, strips, and the like) along a member that needs to be moved, such as a seat wing, seat back, and the like. As will be discussed in more detail below, an elastic plate can be embedded with SMA wires to produce such movement in various seat portions. Bending of the elastic plate, and therefore sections of the seat, can be attained by moving the SMA wires off the neutral plane of the elastic plate and activating (i.e., contracting) all the wires in the same direction. Twisting can be accomplished by activating just some of the SMA wires or by activating each SMA wire in a defined sequence to produce the twist.

Moreover, conforming and reconfiguring of the active material enabled seats can be accomplished with active material seat fibers, such as SMA fibers. The seat surface can be comprised of SMA wires and their configuration can affect the conformability of the active material based seat. For instance, the SMA wires can be woven with current seat fabrics in a parallel configuration, a perpendicular cross configuration, or can the SMA fibers can be configured at an angle to one another. The various configurations is effective to create different "waves" of configuration. The fibers can then be combined with different activation strategies that will provide various reconfigurable seat features.

Figure 2:
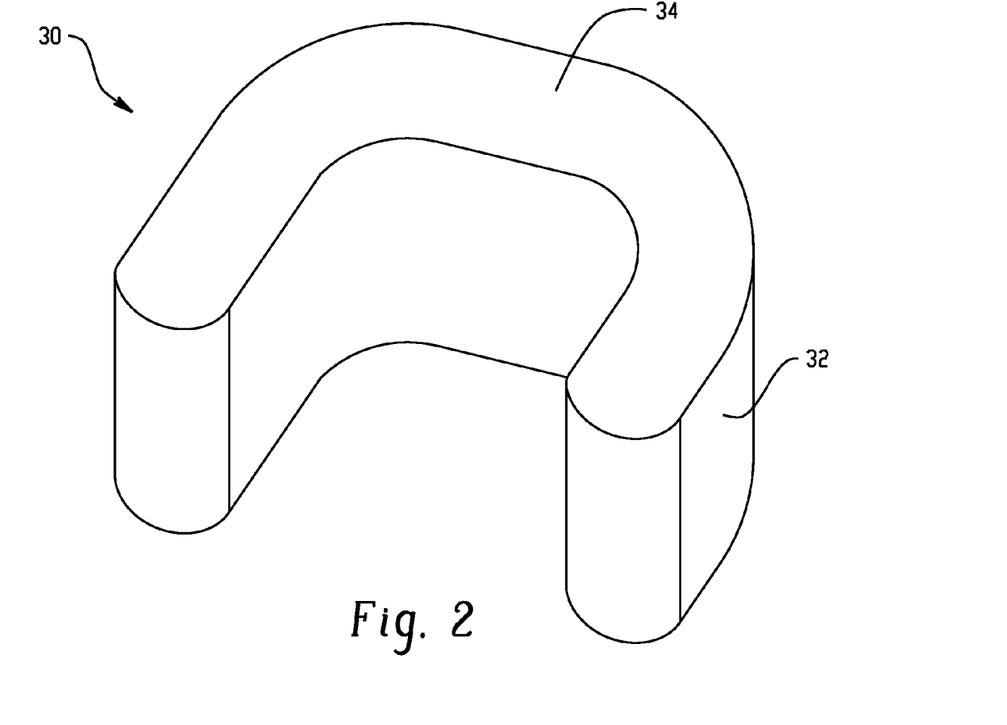
FIG. 2 is a perspective view of an active material based seat in accordance with another embodiment of the present disclosure.
Figure 3:
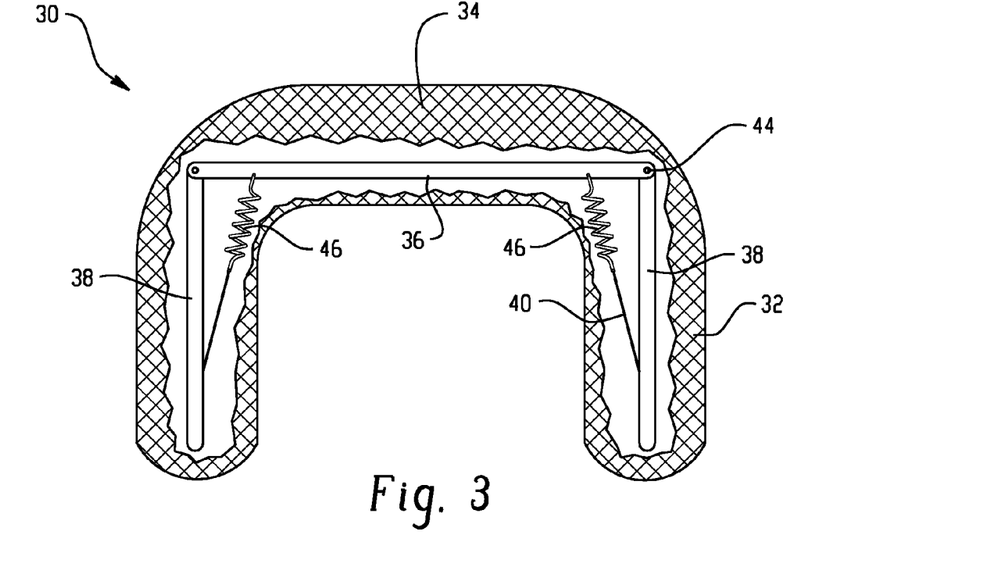
FIG. 3 is a top down sectional view of the active material based seat of FIG. 2.

FIGS. 2 and 3 illustrate an active material based seat in accordance with another exemplary embodiment. The seat, generally designated by reference numeral 30, comprises wing portions 32 extending from a lateral support section 34. An active material, for example, a SMA wire 40 can be used to selectively orient the wing portions 32 relative to the lateral support 34 upon receipt of an activation signal. In this manner, the seated occupant can be wrapped with the wings to provide greater support and comfort regardless of the occupant's frame size. As the SMA is activated it pulls in the arms 38 about the pivot 44. A bias spring 46 is tensioned (because it is in series with the SMA wire 40) during the activation. This can be represented by any other stress relief mechanism. The bias spring 46 is effective to prevent too much pressure from being applied against a seat occupant. The bias spring 46 can also be a superelastic SMA itself to provide a high initial stiffness and then a soft stiffness at the onset of the stress-induced austenitic-to-martensitic transformation that occurs during the activation. This would allow for deformation of the spring 46 as the SMA wire 40 keeps contracting. Upon deactivation of the signal, the arms are pushed outwards about the pivot 44 with the bias springs 46, deforming or helping to deform the SMA materials back to the martensite state. FIG. 3 is a cross-sectional view of the active material seat 30 illustrating the frame, which includes a main member 36 and the arms 38 in pivotable communication with each other via the pivots 44. The main member 36 forms the lateral support section 34 and the two arms 38 form the wings 32 of the seat 30.

Figure 4A:
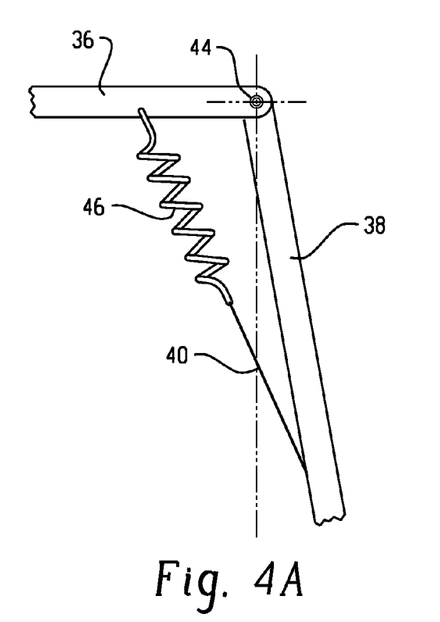
FIG. 4 is a top down sectional view of the mechanism employed in FIG. 3 in (a) a first position and (b) a second position, wherein the positions are actively manipulated with an active material.
Figure 4B:
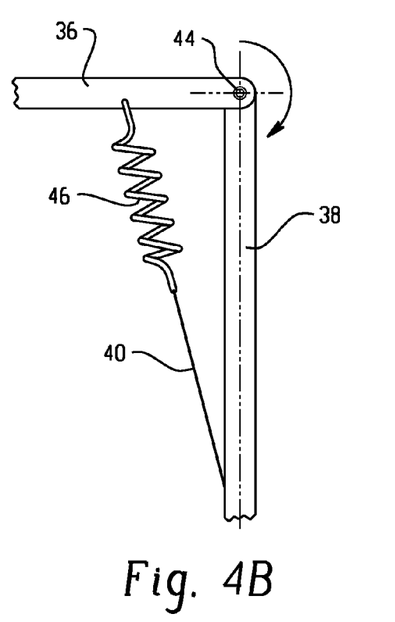

As shown more clearly in FIG. 4, the SMA wires, designated by reference numeral 40, are operatively attached from any point of the main member 36 to the end of the wing members 38. As an electric signal is supplied to the SMA wires 40, the alloy heats up to the martensite-to-austenite transition temperature. As the transformation takes place, the SMA wires 40 contract forcing the wings to rotate about the pivots 44 toward the occupant. The contraction in a length dimension of the SMA wires 40 is accompanied with a large recovery force and is effective in rotating the arms 38 from a first position (as shown in FIG. 4(a)) to a second position (as shown in FIG. 4(b)). Returning to FIG. 3, a return mechanism, in this case the bias springs 46, operatively attached to the SMA wire 40, can be configured to have a low stiffness and prevent excessive forces from being exerted to the occupant's back by the wings 32. Other possible bias mechanisms can include, without limitation, motors, micro-hydraulic systems, and the like.

Figure 5:
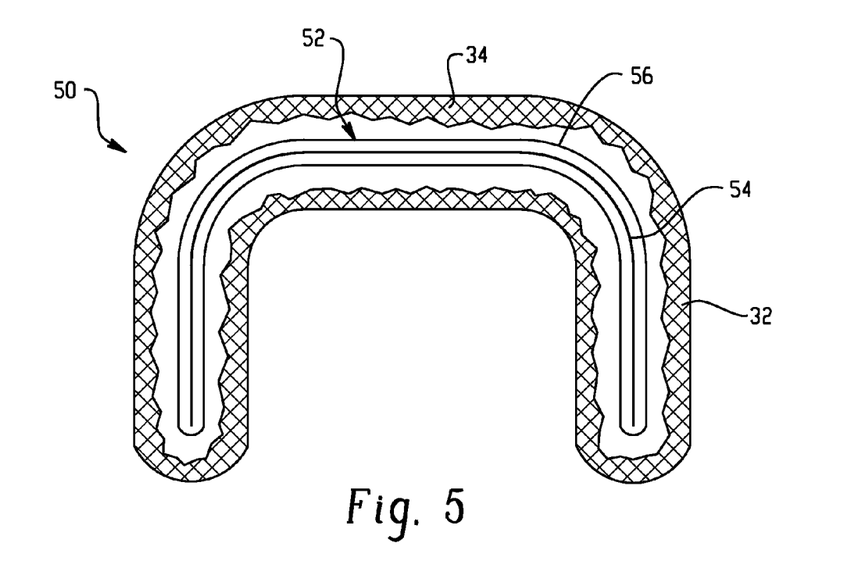
FIG. 5 is a top down sectional view of the active material based seat in accordance with another embodiment.

FIG. 5 illustrates another embodiment of an active material based seat 50. In this embodiment, the seat 50 comprises an active material composite plate 52 configured to provide lumbar support for a seated occupant. The active material composite plate can comprise one or more SMA wires 54 embedded into a flexible elastic matrix 56. In this embodiment, the SMA wires are not placed in the neutral plane of the composite plate 52. Instead, the SMA wires 54 are at a given distance (that can be calibrated) to force the composite plate 52 to bend. The active material composite 52 extends through the lateral support portion 34 of the seat 50 into the wing portions 32. The active composite is configured such that upon reciept of a heat signal, the SMA wires 54 undergo a contraction in a length dimension which is effective to bend the flexible elastic matrix 56. The bending of the flexible elastic matrix 56 forces joint portions of the lateral support 34 and the wing portions 32 to engage the seated occupant's back and/or sides, thereby providing reconfigurable support. In addition, the residual stresses induced by the SMA wires 54 into the elastic matrix 56 can function to provide a change in the overall stiffness of the seat 50 for added comfort control. In another embodiment, the active composite plate could be a combination of SMA and SMP materials.

The active material based seats as disclosed above can function to reversibly conform to a seated occupant and can reconfigure upon use by a subsequent occupant. The active material based seats are able to conform and reconfigure through inflation and/or deflation of a bladder; by flexing to snug around a sleeping occupant; by conforming in specific sections or portions; and by changes in softness/stiffness. For example, depending on the configuration and angle, the active material based seats can bend in and out creating a bubble positive and bubble negative in order to conform to a particular occupant. Moreover, the active materials can flex, fold, twist, and the like such that seat side limbs can fold inward or twist downwards thereby increasing surface area for a larger occupant.

In another embodiment of an active material based seat, one or more bladders can be distributed on the surface of a selected one or both of the seat back and seat cushion. The bladders can contain active material in the form of fluids. The active material fluids are configured to provide a soft, comfortable seat under normal operation, but stiffen during a high rate loading impact event. In one example, the active material fluids can comprise shear thickening fluids, wherein the shear thickening fluid has a first viscosity and the bladder provides a soft seat cushion. The deformation rates at which the viscosity change occurs can be tailored based on the particular impact or application situation. In response to high deformation rates, however, the shear thickening fluids stiffens to a second, higher viscosity, wherein the seat cushion provides greater local dissipation of energy, reduces relative movement of body parts, and transfers loads to the seat structure. The shear thickening can even exhibit properties of a solid when it is stimulated by moderate strain rates. In another example, the active material fluids are MR or ER fluids whose yield stresses are tailorable, wherein the yield stress is proportional to the magnitude of the activation signal, i.e., applied field. A magnetic field is applied in the case of MR fluids, and an electrical (voltage) field is applied for ER fluids.

Figure 6:
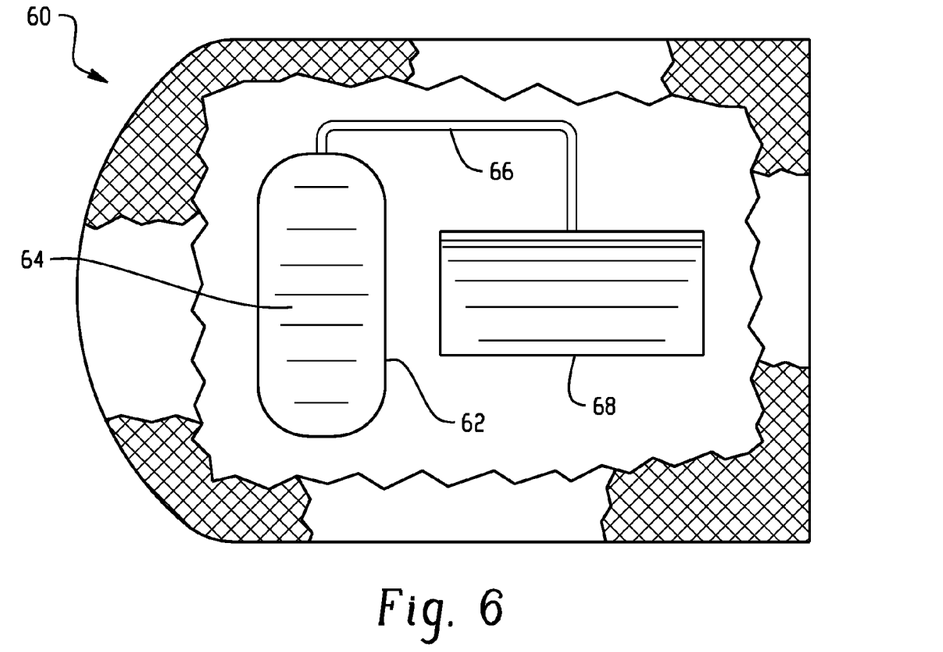
FIG. 6 is a top down sectional view of the active material based seat in accordance with yet another embodiment.

Referring now to FIG. 6, an exemplary active material based seat 60 is shown. The seat 60 comprises a bladder 62 containing a shear thickening fluid 64. A small channel 66 connects the bladder 62 to a reservoir 68. At small shear rates, such as those experienced under normal driving and/or stationary conditions, the shear thickening fluid 64 can flow back and forth between the reservoir 68 and the bladder 62. In the event of an impact to the seat 60, the shear thickening fluid 64 exhibits a high shear rate such that the fluid remains in the bladder 62 and cannot flow into the reservoir 68. The fluid 64, therefore, is configured to offer resistance to deformation when exhibiting the high shear rate as a result of the impact. In another embodiment of this example, the small channel can include flow control devices that open or close based on the rate and/or momentum of the fluid flowing through.

Figure 7:
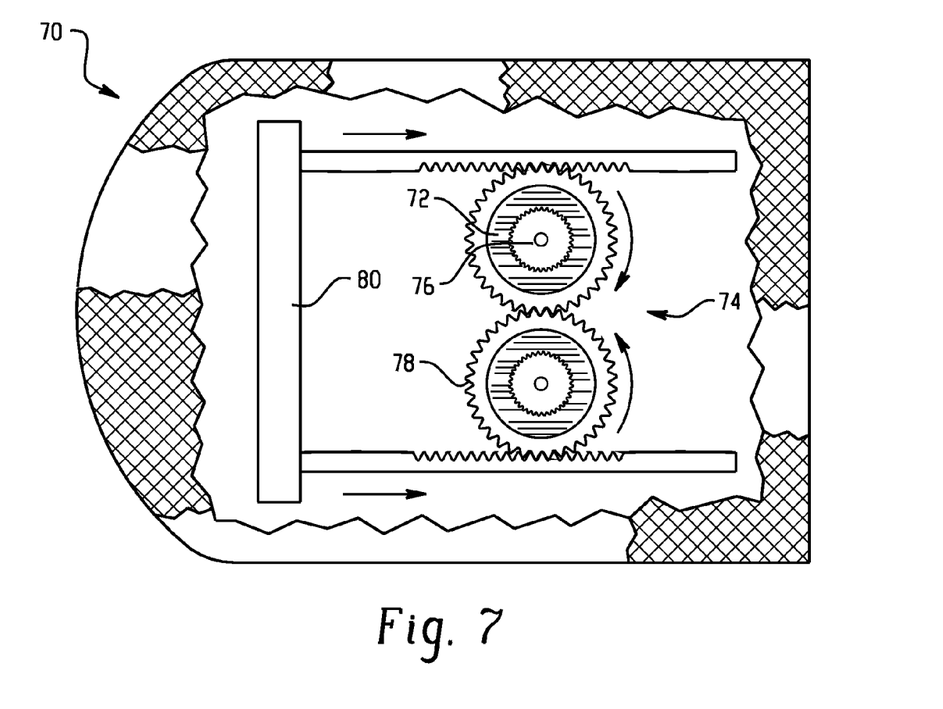
FIG. 7 is a top down sectional view of the active material based seat in accordance with still another embodiment.

FIG. 7 illustrates another embodiment of an active material based seat 70 comprising a shear thickening fluid 72. In this embodiment, the shear thickening fluid 72 is located in a gear assembly 74. The shear thickening fluid 72 is disposed between a fixed internal gear 76 and a rotating external gear 78 of the gear assembly 74. The rotating external gear 78 is in operative communication with a seat frame 80, which is configured to support the occupant. A change in the shear rate of the fluid is effective to turn the rotating external gear 78 and move the seat frame 80, thereby increasing or decreasing the resistance of the seat 70 to deformation.

Figure 8A:
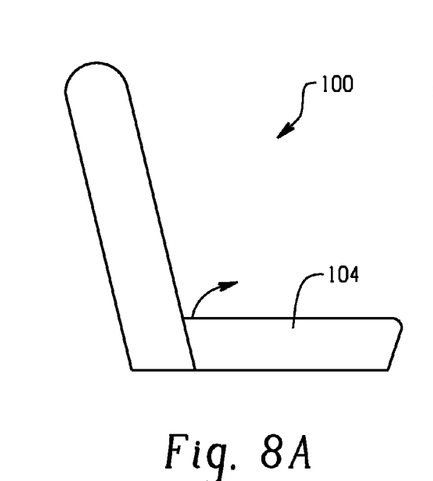
FIG. 8 is a perspective view of one embodiment of an active material based seat comprising a reversible curb in (a) a stowed position and (b) a deployed position.
Figure 8B:
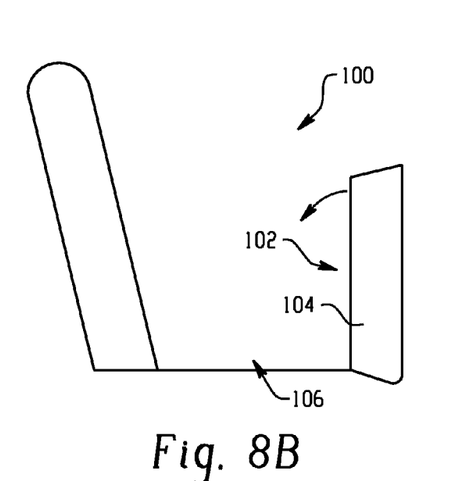

In another embodiment, the reversible reconfiguration of an active material based seat can be used to prevent an item from sliding off a seat while driving, rather than simply adjusting to conform to a seated occupant. FIG. 8 illustrates one embodiment of a seat 100 having a curb feature 102. As used herein the term "curb" is generally intended to mean any shape of seat cushion that is effective to prevent an item placed in the seat from sliding/falling off while driving, such as during cornering or hard braking. The curb 102 of the seat 100 has a stored shape (as shown in FIG. 8(a)) that is configured to provide a normal seating surface for an occupant. As shown in FIG. 8(b), however, the seat cushion 104 is capable of being unfolded to form a well-shape 106, wherein the seat cushion 104, in the unfolded (i.e., deployed) position forms the curb 102. The well-shape 106 is effective to hold an item in place while driving. In this particular embodiment, the seat 100 can comprise active materials, or alternatively, the seat can be comprised of a non-active material.

Figure 9A:
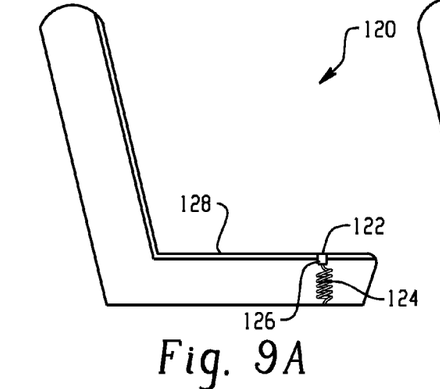
FIG. 9 is a perspective view of another embodiment of an active material based seat comprising a reversible curb in (a) a stowed position and (b) a deployed position.
Figure 9B:
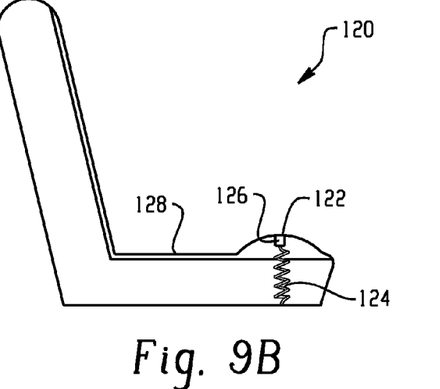

In another exemplary embodiment, an active material based seat 120 is shown comprising a reversible curb 122. In one example, the reversible curb 122 comprises an active material; such as an SMA spring 124, in operative communication with a member 126 configured to engage the seat cushion surface 128. As shown in FIG. 9, the SMA spring 124 is configured to undergo a change in a length dimension upon receipt of an activation signal. The change in a length dimension is effective to pull the member 126 with the seat cushion surface 128. Therefore, through the activation (can be configured as deactivation) of the SMA spring 124, the seat cushion surface 128 can have a substantially flat surface suitable for a seated occupant (as shown in FIG. 9(b)) or can have a curb 122 suitable for holding an item on the seat cushion surface (as shown in FIG. 9(a)) when the activating signal is off. Alternatively, one can also consider the same mechanism indicated in FIG. 5 with the SMA embedded into a composite plate. In this case, if the SMA is activated, bending is induced and if the composite is pinned on both sides, this will force the seat to rise (by bending of the plate). Again, the composite plate could be a combination of SMA and SMP.

Figure 10A:
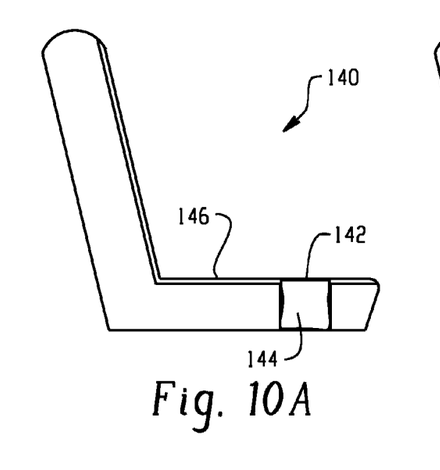
FIG. 10 is a perspective view of yet another embodiment of an active material based seat comprising a reversible curb in (a) a stowed position and (b) a deployed position.
Figure 10B:
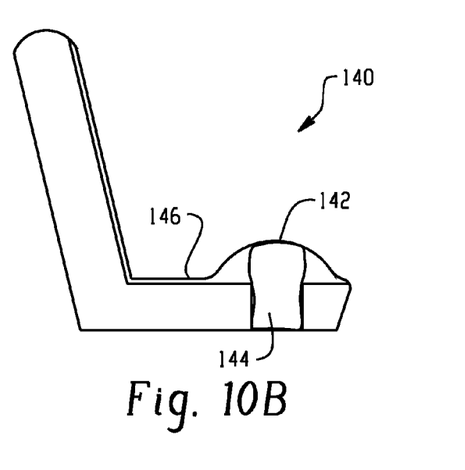
Figure 11A:
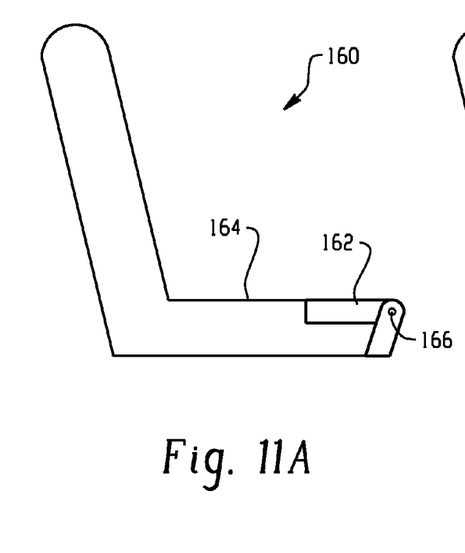
FIG. 11 is a perspective view of one embodiment of an active material based seat comprising a reversible curb disposed on a front portion of the seat in (a) a stowed position and (b) a deployed position and a reversible curb disposed beneath the seat cushion in (c) a stowed position and (d) a deployed position.
Figure 11B:
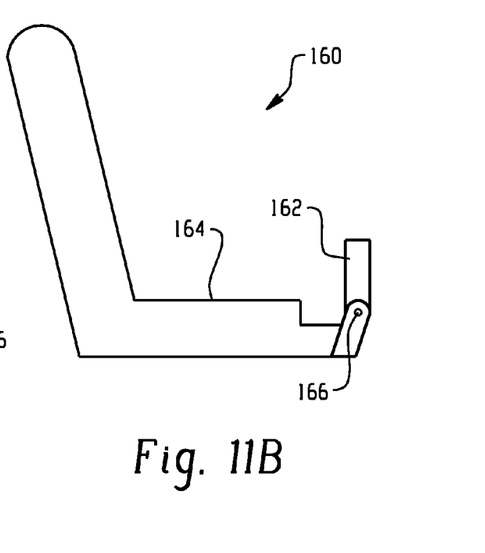
Figure 11C:
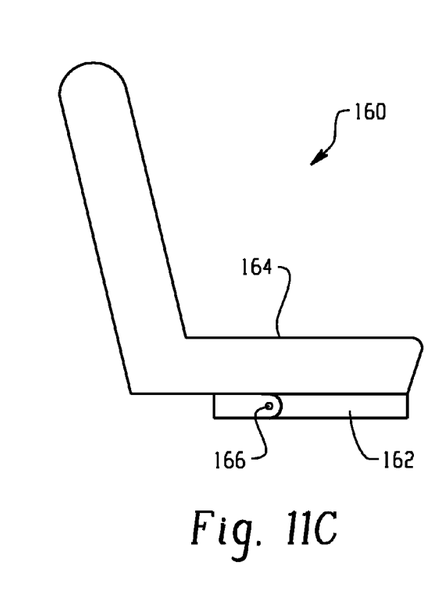
Figure 11D:
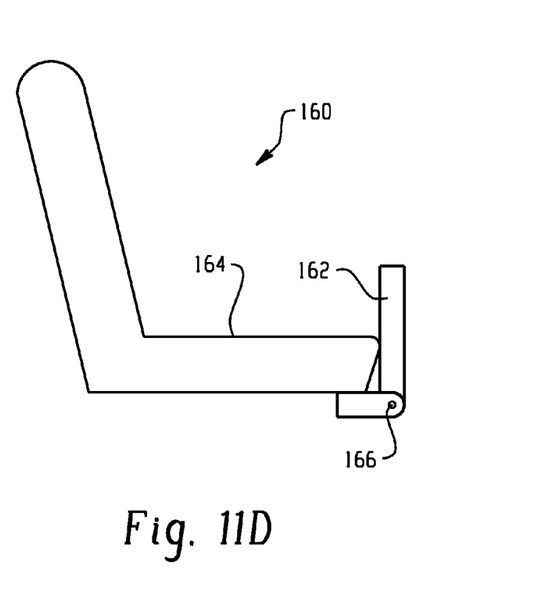

In FIG. 10, a similar embodiment of an active material based seat 140 is shown comprising a reversible curb 142. In this example, the reversible curb 142 comprises a bladder 144 and an SMA actuated valve (not shown). The SMA actuated valve is configured to permit inflation or deflation of the bladder 144 in response to an activation signal. When the bladder 144 is deflated, a seat cushion surface 146 has a substantially smooth surface (as shown in FIG. 10(a)) suitable for a seated occupant. When the bladder 144 is inflated, the seat cushion surface 146 comprises a curb 142 (as shown in FIG. 10(b)) suitable for holding an item in place on the seat cushion surface. In another embodiment, active material pumps, such as those using piezoceramics, EAP, or thin film SMA could be used to move fluids into the bladder 144 for inflation. The fluid could be air, or in another embodiment, could be an active fluid, such as those mentioned above. Moreover, shear thickening and thinning fluids can also be used to improve energy absorption of the bladders and, therefore, the seats.

FIG. 11 illustrates yet another embodiment of an active material based seat 160 comprising a curb 162. The curb 162 comprises a front portion of the seat cushion 164 and is configured to rotate up from a stored position that is coplanar with the seat cushion. The curb 162 can comprise an active material configured to undergo a change in at least one property upon receipt of an activation signal. The change in at least one property is effective to transition the curb 162 from a stowed position (as shown in FIG. 11(a)) to a deployed position (as shown in FIG. 11(b)). The stowed position provides a seat cushion surface suitable for a seat occupant, while the deployed position is suitable for holding an item in place on the seat cushion 164. For example, a hinge portion 166 comprises a SMP. Upon receipt of a heat signal, the SMP softens and the curb 162 can be rotated into the deployed position either manually, or by mechanical means such as a bias spring. The heat signal can then be removed from the SMP, allowing the material to cool (i.e., stiffen), thereby locking the curb 162 in the deployed position. When it is desired to stow the curb 162, the heat signal can again soften the SMP, permitting the curb 162 to be rotated back to the stowed position. In another example, a SMA spring can be configured to deploy the curb rather than an SMP hinge. In still another example, SMA wires and/or ribbons can be disposed between the curb 162 of the seat 160 and the seat cushion 164 itself. Heating of the SMA ribbons can be effective to deploy the curb 162. FIGS. 11(c) and 11(d) illustrate an alternative location for the curb 162. In this example, the curb 162 is stowed beneath the seat cushion 164, rather than hingeably attached to the front portion. From this position, the curb 162 can be similarly deployed with active materials as described above. Active composites as those discussed for FIG. 5 could be also used as the hinge. Alternatively, a bi-stable hinge can be also used, e.g., a superelastic bi-stable hinge.

Figure 12A:
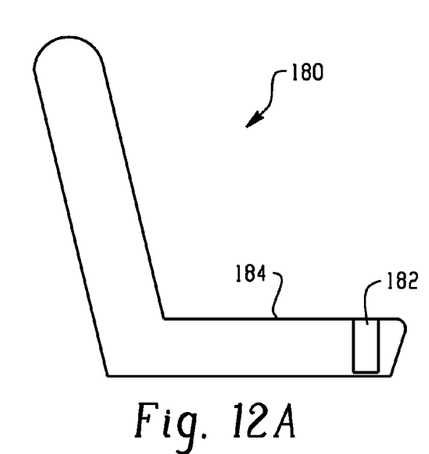
FIG. 12 is a perspective view of one embodiment of an active material based seat comprising a reversible curb disposed in a front portion of the seat in (a) a stowed position and (b) a deployed position.
Figure 12B:
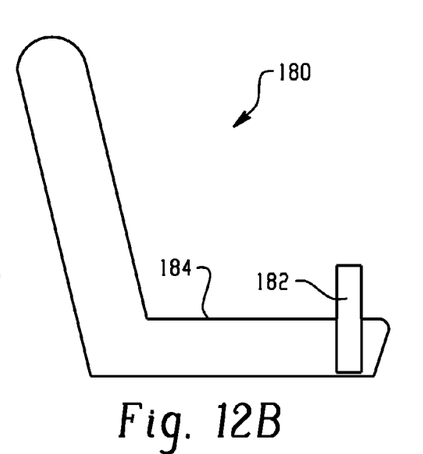
Figure 13A:
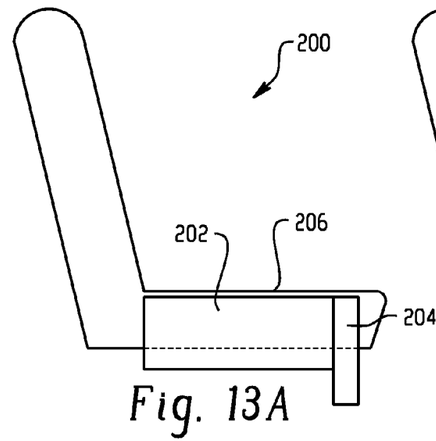
FIG. 13 is a perspective view of one embodiment of an active material based seat comprising a reversible curb in (a) a stowed position, (b) a deployed position, and (c) a pivoted deployed position.
Figure 13B:
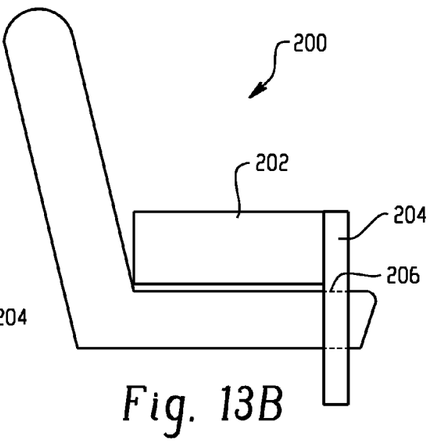
Figure 13C:
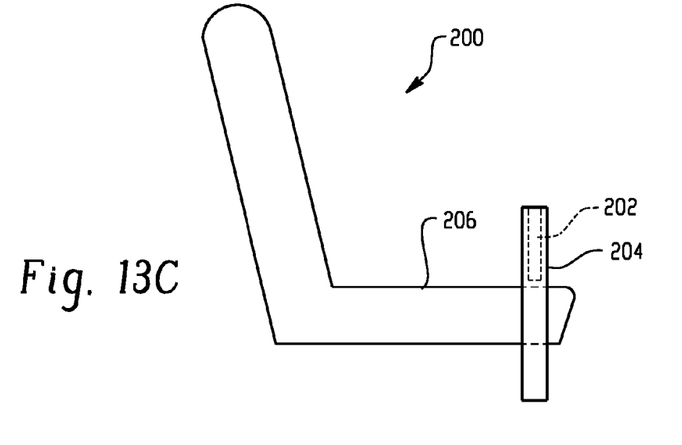

FIG. 12 illustrates another embodiment of an active material based seat 180 comprising a curb 182. The curb 182 comprises a front portion of the seat cushion 184 and is configured to slide up from a stored position that is coplanar with the seat cushion. The curb 182 can comprise a relatively flat member and an active material in operative communication with the member configured to undergo a change in at least one property upon receipt of an activation signal. The change in at least one property is effective to transition the member of the curb 182 between a stowed position (as shown in FIG. 12(a)) and a deployed position (as shown in FIG. 12(b)). The stowed position provides a seat cushion surface suitable for a seat occupant, while the deployed position is suitable for holding an item in place on the seat cushion 184. For example, a bias spring could transition the curb 182 to the deployed position and an SMA wire could return the curb 182 to the stowed position upon receipt of a heat signal which causes the SMA wire to contract in a length dimension. FIG. 13 illustrates a variation of this embodiment for an active material based seat 200. The seat 200 comprises as curb 202, which is disposed in an alternative location on the side of the seat 200. In this example, the curb 202 comprises a pivot 204. The curb 202 can be manually or automatically slid from the stowed position on the side of the seat (as shown in FIG. 13(a)) to a deployed position (as shown in FIG. 13(b)). The pivot 204 is effective to swing the curb 202 into a pivoted deployed position wherein the curb is capable of functioning to hold an item in place on the seat cushion 206.

In the exemplary embodiments described herein, the occupant (i.e., user) can change the surface or contour of the active material based seats manually or with an activation device. Such a device can be in the form of a switch, toggle, key, button, touch screen, and the like. Alternatively, the seats can be activated upon some happening of a condition, signal from a sensor, switching of an sensor, or the like, rather than directly user activated. For example, the active material based seats can incorporate sensors to help actively adjust to vehicle conditions such as impact events from the side, front, rear, or combinations thereof. The seat can respond actively to precondition prior to an event, for example, by having an energy absorption mechanism. The active material can be activated to make the seat stiffer or softer upon detecting the event; depending on the event's type and location (e.g., front versus rear). Further, the active materials can be used to create seat settings based on sensor data such as, occupant weight, height, size, weight distribution, and the like. Even further, the seat settings could be linked to an adaptive feature, for example, the seat settings may be tied to a user identification system such as a driver's key fob, a door or seat memory selection switch, and the like. In another example, occupant body heat, or a lack of body heat, or pressure created by an occupant's body can be effective to activate the active material within the active material based seat.

As disclosed herein, the active material based seats are configured to reversibly conform and reconfigure upon receipt of an activation signal. The active material based seats can have multiple sections capable of conforming and reconfiguring beyond the exemplary embodiments mentioned above. The active material enabled seats can be configured to fold, flex, twist, inflate, follow contours in multiple planes, and the like. Such motion can be achieved, for example without limitation, by distributing one or more SMA elements (e.g., wire or ribbons) along a member that needs to be moved, such as a seat wing, seat back, and the like or by having the active elements remotely as actuators and operatively connected to the seats.

In other embodiments, sides can be added inside the active material based seats that can slide and reconfigure to create child booster seats, wherein an active material, such as a SMA, piezoelectric, EAP, magnetorestrictive solids, and the like, can achieve the reconfiguration. An active material based seat can further include an active material based footrest. For example, the footrest could be stored under the seat. When use of the footrest is desired, it can be expanded in a manner similar to that described above for the curbed seats, such as by inflation of an embedded bladder or activation of a piezoceramic patch. When it is desired to stow the footrest, SMA elements can be configured to return the footrest under the seat. In another embodiment, the footrest can be comprised of SMP. Upon heating of the SMP, the footrest can be softened and manually pushed back under the seat. In yet another example, the active material based seats can optionally include an extendedable-retractable portion of the seat cushion. This extendable portion can operate like the hingeable curb described above, but rather than forming a curb, the portion extends out from the seat cushion creating a longer seating surface to increase the comfort of large occupants, such as persons with heights in the $95^{th}$ percentile.

As stated above, the seats described herein advantageously utilize active materials to provide reversible conforming and reconfigurable changes. The use of active materials overcomes many of the disadvantages associated with the conventional mechanical-based actuators noted above. For example, active material based seats disclosed herein are more robust than strictly electromechanical approaches as they can have no mechanical parts, it being the material itself that changes in stiffness and/or dimension. Nor do they emit either acoustic or electromagnetic noise/interference. Due to their small volume, low power requirements, and distributed actuation capability, active materials can be embedded into the seat at various locations to allow tailoring to the desires of the occupant, needs of the driving scenario, and nature and severity of the identified threat. They can also be located in specific locations in the seat and actuated in a certain sequence or just in select locations to match occupant and situational needs. Moreover, they can be distributed over the surface for greater seat stiffness. They can be used remotely and operatively connected to the seats.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A seat assembly, comprising:
a horizontal seat surface comprising a reversible curb; and
an active material in operative communication with the seat surface configured to undergo a change in at least one property upon receipt of an activation signal, wherein the change in at least one property is effective to transition the reversible curb from a stowed position to a deployed position, where in the stowed position the surface presents a first profile, and in the deployed position the reversible curb causes the surface to present a second profile defining a raised portion configured to laterally secure an item placed on the surface wherein the reversible curb is pivotally coupled to a hinge portion comprised of the active material, the change in at least one property is effective to rotatably translate the reversible curb from the stowed position to the deployed position, the support structure includes a seat base, the reversible curb and hinge portion are linearly translatable relative to the base, the curb is prevented by the base from rotating relative to the hinge in the stowed position, and the change in at least one property causes the curb and portion to linearly translate to the deployed position where the curb is free to rotate relative to the portion.

2. The seat assembly of claim 1, wherein the active material actuator comprises a shape memory alloy, a ferromagnetic shape memory alloy, a shape memory polymer, a magnetorheological elastomer, an electrorheological elastomer, an electroactive polymer, a piezoelectric material, a magnetorheological fluid, an electrorheological fluid, a shear thickening fluid, or combinations comprising at least one of the foregoing active materials.

3. The seat assembly of claim 1, wherein the activation signal comprises a thermal activation signal, an electric activation signal, a magnetic activation signal, a chemical activation signal, a mechanical load, or a combination comprising at least one of the foregoing activation signals.

4. The seat assembly of claim 1, wherein the active material is a shape memory alloy spring in operative communication with a member configured to engage the seat surface, wherein the shape memory alloy spring is configured to undergo a change in a length dimension upon receipt of the activation signal, wherein the change in a length dimension is effective to engage the member with the seat surface thereby transitioning the reversible curb from the stowed position to the deployed position.

5. The seat assembly of claim 1, wherein the reversible curb further comprises a bladder in operative communication with the seat surface, wherein the active material is disposed within the bladder, and the change in at least one property of the active material is effective to inflate the bladder and transition the reversible curb from the stowed position to the deployed position.

* * * * *